A. Ware
Surveying Instrument.
N° 29,835.　　　　Patented Aug. 28, 1860.
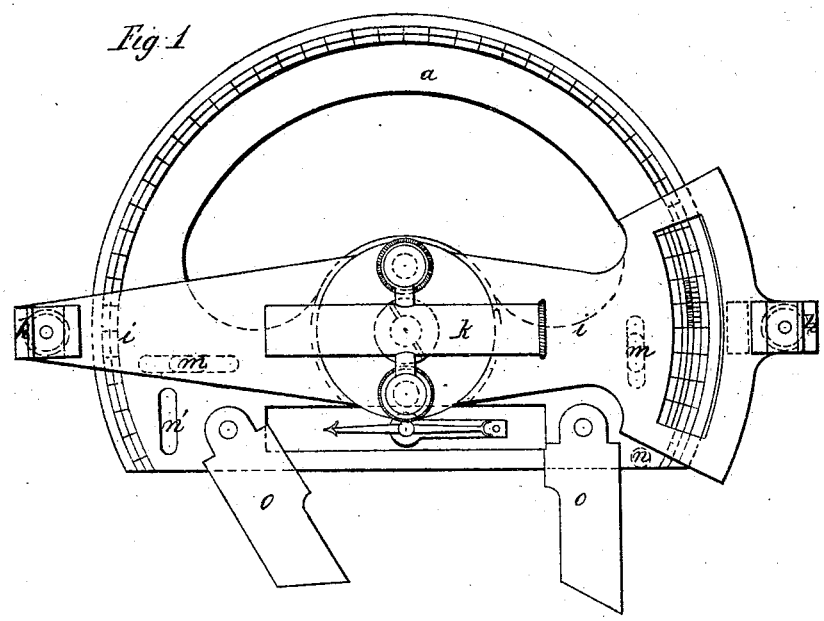
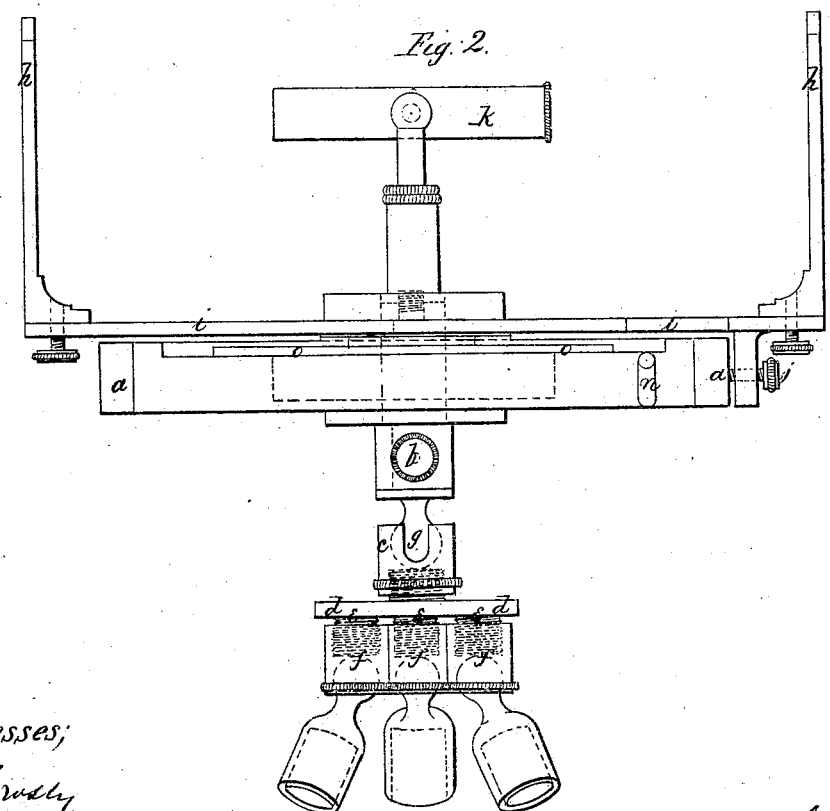
Witnesses:
Inventor,
Abel Ware

UNITED STATES PATENT OFFICE.

ABEL WARE, OF ATHENS, MAINE.

SURVEYOR'S INSTRUMENT.

Specification of Letters Patent No. 29,835, dated August 28, 1860.

*To all whom it may concern:*

Be it known that I, ABEL WARE, of Athens, in the county of Somerset and State of Maine, have invented certain new and useful Improvements in Instruments for Measuring Vertical and Horizontal Angles; and I do hereby declare that the following, taken in connection with the drawings which accompany and form part of this specification, is a description thereof so full and exact as to enable those skilled in the art to practice my invention.

The object of the invention is to produce an instrument which, while it is adapted to the measurement of both vertical and horizontal angles, shall be much simpler and less expensive than the theodolite, while, like the theodolite, it is capable of performing the work of the transit and circumferentor, though its cost is about the same as that of either of the last named instruments. My instrument is not designed to obtain the greatest degree of accuracy possible, but to fill a long felt want of an instrument which shall be cheap, compact, portable, and sufficiently correct to supply the ordinary requirements of the land surveyor in taking both vertical and horizontal angles.

The nature of my invention consists in the employment of a combination of parts, operating in the manner substantially as herein described, by which I am enabled to use but one graduated "limb" or circle, and rotating vernier plate or carriage, with its sights or telescope, in taking horizontal and vertical angles.

Figure 1 of the drawings is a plan, and Fig. 2 a side elevation of an instrument embodying my invention.

($a$) is a graduated limb or circle which is fixed, through a pin and socket, to a tripod by means of a set screw ($b$).

Surmounting the tripod, and beneath set screw ($b$), is located the ball and socket joint, by means of which, ($a$), and the parts thereunto attached, is changed from a horizontal to a vertical position, and vice versa, a slot in the socket ($c$) permitting this movement.

The plate ($d$), to which the socket ($c$) is screwed, is provided with three screws ($e$), by means of which, and the nuts formed in the sockets ($f$), upon the balls of the caps of the tripod legs, nice adjustment of ($a$) in a horizontal or vertical position is obtained subsequently to its approximate adjustment by the ball and socket joint ($g$) ($c$).

The sights ($h$) are such as are used with the common circumferentor, and like them are made removable from the vernier plate or carriage ($i$) which is provided with a set screw ($j$) to clamp it to ($a$) in any desired position.

The telescope ($k$) is made reversible, and like the sights ($h$) is so connected with the vernier plate as to be removable therefrom at pleasure, so that the sights or the telescope can be used alternately as may be most convenient. Horizontality of ($a$) is determined by observation of the levels ($m$), and its vertical position by the level ($n$), and the position of the zero line, when taking vertical angles, by the level ($n'$).

The magnetic needle is located, as shown, within a recess formed in ($a$) and protected by the covers ($o$).

Description of the manipulation of my instrument in taking angles is unnecessary, for that will be readily understood upon inspection by engineers and surveyors.

Prior to my invention it was deemed necessary to make use of two separate "limbs" or graduated circles and their respective verniers for the measurement of both vertical and horizontal angles, and these graduated circles and verniers were sometimes combined in one instrument as in the theodolite or were used in separate instruments.

What I claim as my invention, and desire to secure by Letters Patent of the United States, is—

The combination of a single graduated limb, vernier, telescope or sights with substantially the means described for changing the position of the aforesaid parts 90°, all operating together substantially in the manner described.

ABEL WARE.

Witnesses:
J. B. CROSBY,
WM. H. OADES.